(12) United States Patent
Zhang et al.

(10) Patent No.: US 10,565,000 B2
(45) Date of Patent: Feb. 18, 2020

(54) METHOD AND APPARATUS FOR ONLINE UPGRADE OF KERNEL-BASED VIRTUAL MACHINE MODULE

(71) Applicant: Alibaba Group Holding Limited, Grand Cayman (KY)

(72) Inventors: Xiantao Zhang, Hangzhou (CN); Junkang Fu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 141 days.

(21) Appl. No.: 15/806,093

(22) Filed: Nov. 7, 2017

(65) Prior Publication Data
US 2018/0060111 A1 Mar. 1, 2018

Related U.S. Application Data

(63) Continuation of application No. PCT/CN2016/079160, filed on Apr. 13, 2016.

(30) Foreign Application Priority Data

May 7, 2015 (CN) .......................... 2015 1 0230762

(51) Int. Cl.
*G06F 9/455* (2018.01)
*G06F 9/445* (2018.01)
(Continued)

(52) U.S. Cl.
CPC ............ *G06F 9/45558* (2013.01); *G06F 8/65* (2013.01); *G06F 8/656* (2018.02); *G06F 9/445* (2013.01);
(Continued)

(58) Field of Classification Search
None
See application file for complete search history.

(56) References Cited

U.S. PATENT DOCUMENTS 8,656,389 B2 2/2014 Gondi
2003/0120914 A1† 6/2003 Axnix et al.
(Continued)

FOREIGN PATENT DOCUMENTS

CN 101727331 6/2010
CN 101727331 A 6/2010
(Continued)

OTHER PUBLICATIONS

Translation of International Search Report from corresponding PCT application No. PCT/CN2016/079160 dated Jul. 21, 2016, 2 pages.
(Continued)

*Primary Examiner* — Gregory A Kessler
(74) *Attorney, Agent, or Firm* — Lee & Hayes, P.C.

(57) ABSTRACT

An apparatus and a method for online upgrading a kernel-based virtual machine module are disclosed. The method includes reorganizing and compiling a kernel-based virtual machine module to obtain a first running module, the first running module supporting a dual-active mode; and causing a machine virtualizer to use the first running module, obtaining a second running module by compiling according to an upgrade version of codes of the first running module, wherein the second running module is an upgrade version of the first running module, and the machine virtualizer switches to use the second running module.

18 Claims, 10 Drawing Sheets

(51) Int. Cl.
G06F 8/656 (2018.01)
G06F 8/65 (2018.01)

(52) U.S. Cl.
CPC ............ *G06F 2009/4557* (2013.01); *G06F 2009/45575* (2013.01); *G06F 2009/45591* (2013.01)

(56) References Cited

U.S. PATENT DOCUMENTS

2010/0106885 A1† 4/2010 Gao et al.
2013/0055240 A1 2/2013 Gondi
2013/0318515 A1† 11/2013 Bowen
2014/0032699 A1 1/2014 Cohen

FOREIGN PATENT DOCUMENTS

| CN | 102073529 | 5/2011 |
| CN | 102073529 A | 5/2011 |
| CN | 102999369 | 3/2013 |
| CN | 103036947 A | 4/2013 |

OTHER PUBLICATIONS

Translation of Written Opinion from corresponding PCT application No. PCT/CN2016/079160 dated Jul. 21, 2016, 7 pages.
Machine translation of First Chinese Office Action dated Nov. 2, 2018 for Chinese patent application No. 201510230762.5, a counterpart foreign application for U.S. Appl. No. 15/806,093, 5 pages.
Chinese Search Report for Chinese patent application No. 201510230762.5 dated Oct. 10, 2018, 2 pages.

† cited by third party

METHOD AND APPARATUS FOR ONLINE UPGRADE OF KERNEL-BASED VIRTUAL MACHINE MODULE

CROSS REFERENCE TO RELATED PATENT APPLICATIONS

This application claims priority to and is a continuation of PCT Patent Application No. PCT/CN2016/079160 filed on 13 Apr. 2016, and is related to and claims priority to Chinese Patent Application No. 201510230762.5, filed on 7 May 2015, entitled "Method and Apparatus for Online Upgrade of Kernel-Based Virtual Machine Module," which are hereby incorporated by reference in their entirety.

TECHNICAL FIELD

The present disclosure relates to the field of computers, and particularly to the technologies of online upgrades of kernel-based virtual machine modules.

BACKGROUND

A KVM virtual machine (Kernel-based Virtual Machine) is a virtualized basic resource that is used in a Linux kernel, and can convert the Linux kernel into a hypervisor. The "kernel" refers to a system software component that provides functions such as a hardware abstract layer, a hard disk and file system control, multitasking, etc. The hypervisor, which is also known as virtual machine monitor (VMM), can be used for creating and executing a virtual machine on software, firmware or hardware. One or more virtual machines can be implemented by having a hypervisor. This type of computer is defined as a host machine, and a virtual machine implemented thereon is called a guest machine. The hypervisor can be manifested in a form of a guest operating system, and provides a virtual work platform that is responsible for managing operations of other guest operating systems. A plurality of operating systems run thereupon, and share hardware resources after virtualization.

A KVM virtual machine can run multiple virtual machines simultaneously without changing a Linux or Windows image, i.e., a virtual machine uses an image. KVM virtualization can run multiple virtual machines on a physical machine, and configure an individualized hardware environment (e.g., a network card, a magnetic disk, a graphics adapter, etc.) for each virtual machine. A KVM virtualization solution includes a downloadable core module which provides virtual functions of a bottom layer—a KVM module. The KVM module (i.e., kernel-based virtual module) includes kvm.ko and kvm-platform.ko (kvm-platform.ko includes kvm-intel.ko or kvm-AMD.ko, for example). The KVM module is a very important component in bottom layer virtualization technologies of cloud computing, such that the KVM virtualization solution is named after this module. The KVM module is the hypervisor in the entire virtualization solution.

In existing technologies, an upgrade of a KVM module requires that the KVM virtual machines be shut down. This leads to great cost in a public cloud environment, the environment not only suffering a large economic loss and needing to provide a higher amount of compensation for the time when the virtual machines are shut down, but also causing service interruptions to customers and even great losses to the customers.

However, a hot upgrade of an existing KVM module (i.e., an online upgrade of a KVM module without shutting down functions and services) does not exist in the art.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/ computer-readable instructions as permitted by the context above and throughout the present disclosure.

The present disclosure aims to provide a method for online upgrading a kernel-based virtual machine module. The method includes reorganizing and compiling a kernel-based virtual machine module to obtain a first running module that is initialized, the first running module that is initialized supporting a dual-active mode; and causing a machine virtualizer to use the first running module, obtaining a second running module by compiling according to an upgrade version of codes of the first running module, wherein the second running module is an upgrade version of the first running module, and the machine virtualizer is switched to use the second running module.

In implementations, the present disclosure further provides an apparatus for online upgrading a kernel-based virtual machine module. The apparatus includes a first apparatus used for reorganizing and compiling a kernel-based virtual machine module to obtain a first running module that is initialized, the first running module that is initialized supporting a dual-active mode; and a second apparatus used for causing a machine virtualizer to use the first running module, obtaining a second running module by compiling according to an upgrade version of codes of the first running module, wherein the second running module is an upgrade version of the first running module, and the machine virtualizer is switches to use the second running module.

BRIEF DESCRIPTION OF THE DRAWINGS

By reading and referencing the following drawings for the description of non-limiting embodiments, other features, purposes and advantages of the present disclosure can be made more clearly.

Figure 1:
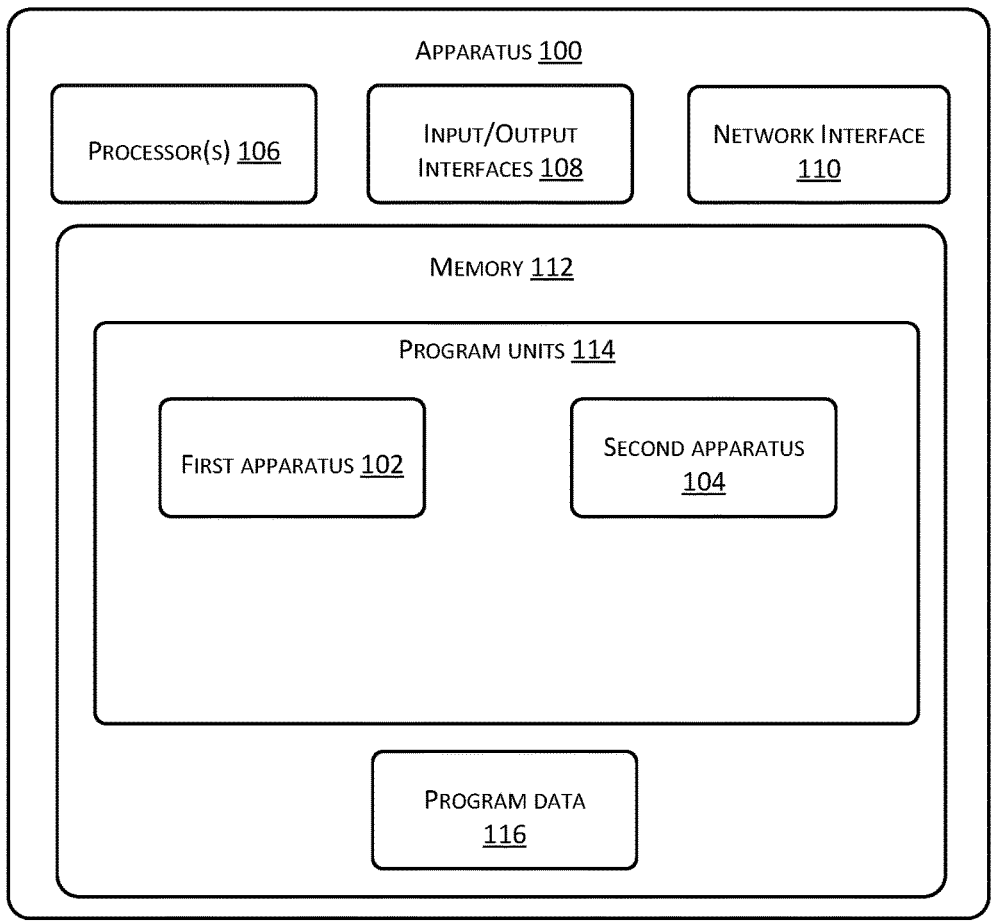
FIG. 1 shows a schematic diagram of an apparatus/device for online upgrading a kernel-based virtual machine module in accordance with the present disclosure.

Same or similar drawing labels in the drawings represent same or similar components.

DETAILED DESCRIPTION

The present disclosure is described in further detail in conjunction with the accompanying drawings.

FIG. 1 shows a schematic diagram of an apparatus or device 100 for online upgrading a kernel-based virtual machine module in accordance with the present disclosure. The apparatus or device 100 includes a first apparatus 102 and a second apparatus 104.

In implementations, the apparatus or device 100 may further include one or more processors 106, an input/output (I/O) interface 108, a network interface 110, and memory 112.

The memory 112 may include a form of processor-readable media or computer-readable media such as a volatile memory, a random access memory (RAM) and/or a non-volatile memory, for example, a read-only memory (ROM) or a flash RAM. The memory 112 is an example of a processor-readable media or computer-readable media.

The processor-readable media or computer readable media may include a volatile or non-volatile type, a removable or non-removable media, which may achieve storage of information using any method or technology. The information may include a processor-readable or computer-readable instruction, a data structure, a program module or other data. Examples of processor-storage media or computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the processor-readable media and the computer readable media do not include transitory media, such as modulated data signals and carrier waves.

In implementations, the memory 112 may include program units 114 and program 116. The program units 114 may include the first apparatus 102 and the second apparatus 104.

The first apparatus 102 reorganizes and compiles a kernel-based virtual machine module, to obtain a first running module that is initialized. The initialized first running module supports a dual-active mode. When the second apparatus 104 performs an online upgrade, a platform machine virtualizer (such as a quick emulator, QEMU, for example) first uses the first running module, and obtains a second running module by compiling an upgrade version of codes of the first running module. The second running module is an upgrade version of the first running module. The machine virtualizer is then switched to use the second running module.

In implementations, the apparatus or device 100 may include, but is not limited to, a network device, a touch terminal, or a device formed by integrating a network device and a touch terminal via a network. Implementations of the network device includes, but is not limited to, a network host, an individual network server, a set of multiple network servers, a set of computers based on cloud computing, etc. The cloud computing is a type of distributed computing, and is a super virtual computer that is formed by loosely coupling a set of computers with one another. In implementations, the apparatus or device 100 may also be gaming software that runs in a touch terminal, such that a user can enjoy entertainment using the touch terminal as a medium. The touch terminal is an electronic product that allows human-machine interactions via a touch screen, e.g., a smartphone, a PDA, a portable gaming device, a handheld computer PPC, a portable device, or a tablet computer, etc. The touch screen includes a capacitive touch screen. One skilled in the art can understand that the apparatus or device 100 and the touch terminal are merely examples. Other existing or future apparatuses 1 or touch terminals, if being suitable for and applicable to the present disclosure, are also included in the scope of protection of the present disclosure, and are included herein by reference.

Furthermore, the first apparatus 102 reorganizes and compiles a kernel-based virtual machine module, to obtain a first running module that is initialized. The initialized first running module supports a dual-active mode.

Figure 2:
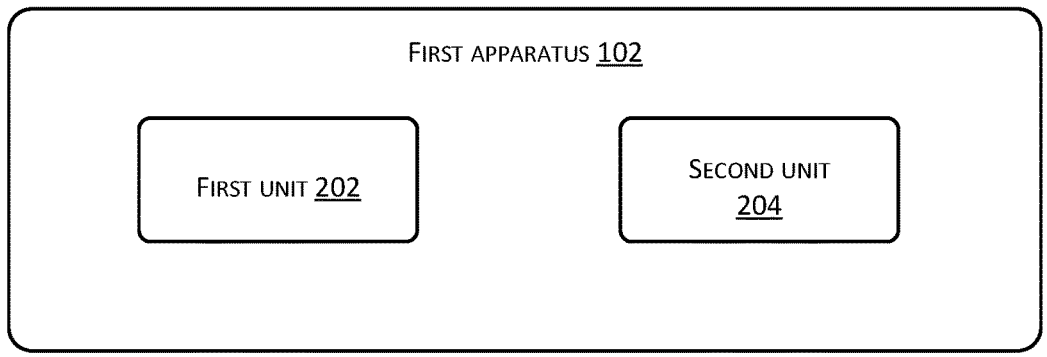
FIG. 2 shows a schematic diagram of a first apparatus of the apparatus/device for online upgrading a kernel-based virtual machine module in accordance with the present disclosure.

FIG. 2 shows a schematic diagram of the first apparatus 102 in more detail. The first apparatus 102 includes a first unit 202 and a second unit 204. The first apparatus 102 reorganizes and compiles kvm.ko and kvm-platform.ko of an original KVM module through the first unit 202 and the second unit 204. The first unit 202 integrates a minimal functional portion that supports virtual machine running and supports running modules in a dual-active mode in the kernel-based virtual machine module into a support module. The support module is used for supporting all running modules. The second unit 204 integrates portions in the kernel-based virtual machine module that are not included in the support module into the first running module.

In implementations, an original KVM module (i.e., an original kernel-based virtual machine module) in a KVM virtualization includes two modules—kvm.ko and kvm-platform.ko (where kvm-platform.ko is kvm-amd.ko for an AMD platform) on a platform (i.e., a host such as Linux, AMD platform, etc.). kvm.ko and kvm-platform.ko run in a root mode of a CPU (central processing unit), and are responsible for initializing CPU hardware virtualized function(s), enabling virtual client machine(s) to run in a KVM virtual machine mode, and providing support to the KVM virtual client machine(s) for running. kvm.ko and kvm-platform.ko mainly include some hardware virtualized functions, such as kernel virtualization, CPU virtualization, and may simulate some hardware devices (such as a pit clock) due to performance consideration. kvm.ko includes virtualized function(s) that is/are unrelated to the platform, and kvm-platform.ko includes virtualized function(s) that is/are related to the platform. kvm.ko provides support to kvm-platform.ko.

In implementations, the first apparatus 102 starts to compile an initial first running module and a support module from an original KVM module through a reorganized and compiled code. The initial first running module and the support module are first used to create virtual machine(s). In this case, a machine virtualizer (e.g., a quick emulator (QEMU)) uses the initial first running module.

The first unit 202 compiles the original KVM module, and integrates a minimal portion of functions that support virtual machine running and support running modules in the dual-active mode (i.e., functions that are simple and almost unrelated to functional performance, such that codes thereof totally does not need to be modified and updated when a new function is added, and extremely few function codes that are needed to support for running of virtual machine(s) and dual-active functions of the first running module and the second running module when an upgrade is performed) into the support module. The second unit 204 integrates a large portion of functions (which are not included in the support module that is integrated from the two modules—kvm.ko and kvm-platform.ko in the original KVM module) into the initialized first running module. The initialized first running module is used as a first running module during the first upgrade. A second running module is compiled and obtained based on an upgrade version of the initialized first running module.

When performing the online upgrade, the second apparatus 104 causes the machine virtualizer to use the first running module first. The first running module compiles a second running module based on an upgrade version of codes of the first running module. The second running module is an upgrade version of the first running module. The machine virtualizer is then switched to use the second running module.

QEMU (i.e., quick emulator) is a component of a KVM virtual machine. The QEMU acts as an upper layer and an interface of the virtual machine, and a client machine (i.e., guest) can operate the virtual machine through the QEMU.

The term "current" refers to a current time point. The first running module is a running module that currently supports virtual machine(s) to run, for example, a running module that is currently used for supporting the virtual machine(s). For example, the first running module, which is currently used for supporting a virtual machine, is kvm-platform-0.ko, and the first running module used by the machine virtualizer uses is kvm-platform-0.ko. In a first upgrade, a running module that supports the virtual machine is switched to kvm-platform-1.ko, and the second running module that the machine virtualizer switches to use is kvm-platform-1.ko. Before the beginning of a second upgrade, the first running module that supports the virtual machine is kvm-platform-1.ko, and the first running module that the machine virtualizer switches to use is kvm-platform-1.ko.

Apparently, one skilled in the art should understand that the names and the number of the running modules are merely examples. Methods that may appear in the future and can implement dual-active running modules are covered in the scope of the concepts of the present disclosure.

Specifically, prior to the online upgrade and prior to obtaining the second running module by compiling in the online upgrade process, the machine virtualizer uses the first running module.

During the online upgrade process, the second apparatus 104 compiles the second running module through the upgrade version of the codes of the first running module. The second running module is the upgrade version of the first running module. The second running module and the first running module are both in a dual-active state, i.e., the second running module and the first running module can both support running of virtual machine(s), and can both obtain support from the support module.

Figure 3A:
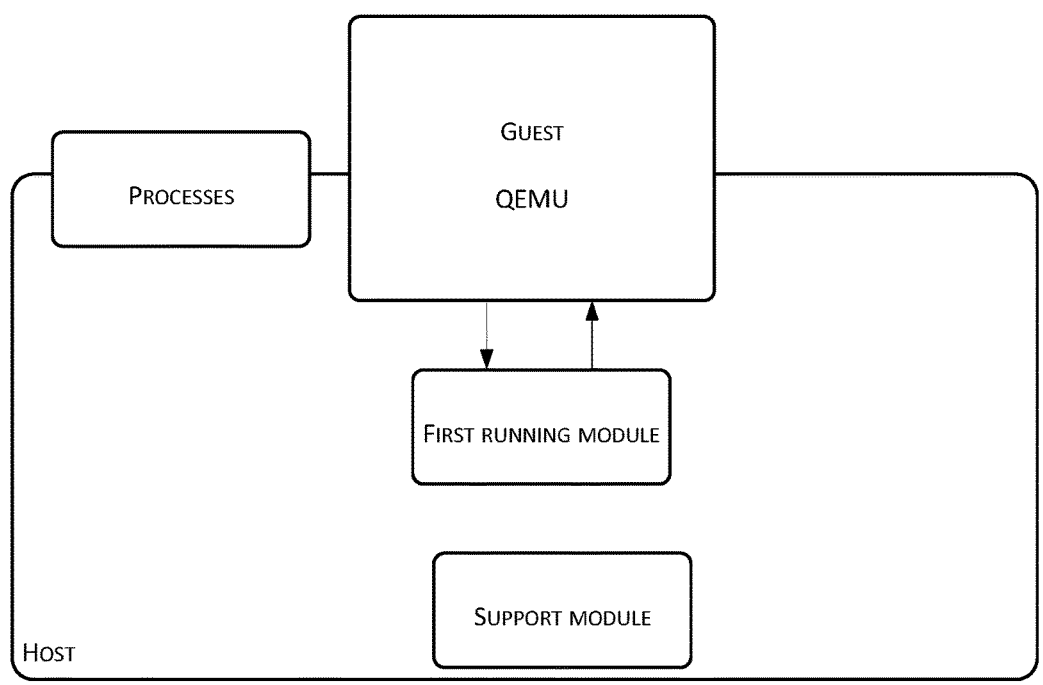
FIGS. 3(A)-(D) show flowcharts of processes for online upgrading a kernel-based virtual machine module in accordance with the present disclosure.
Figure 3B:
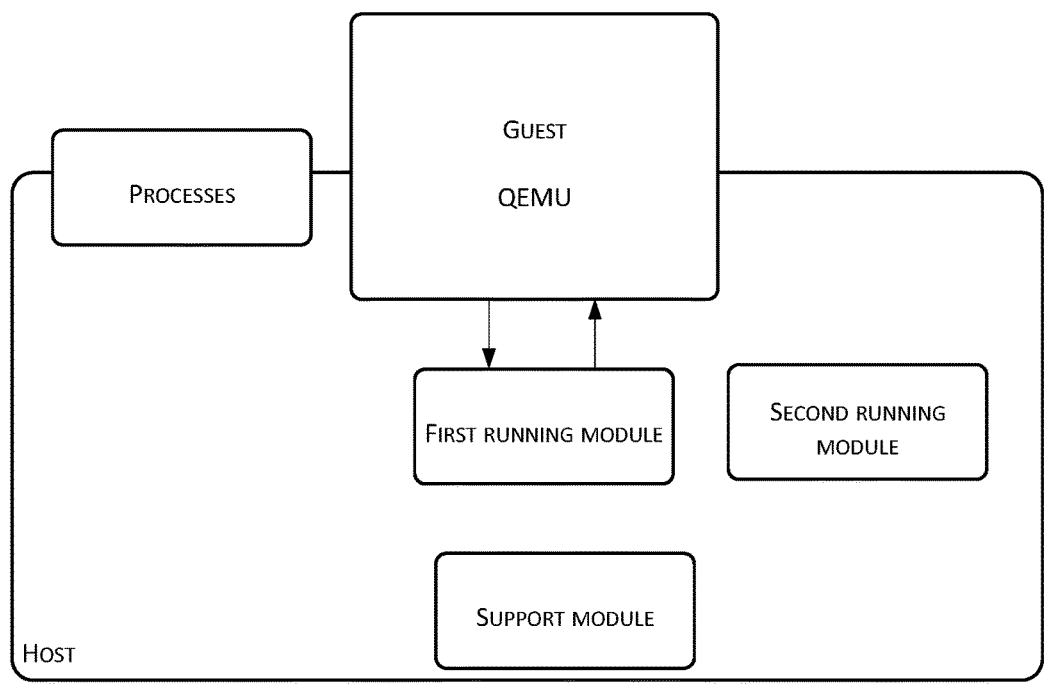
Figure 3C:
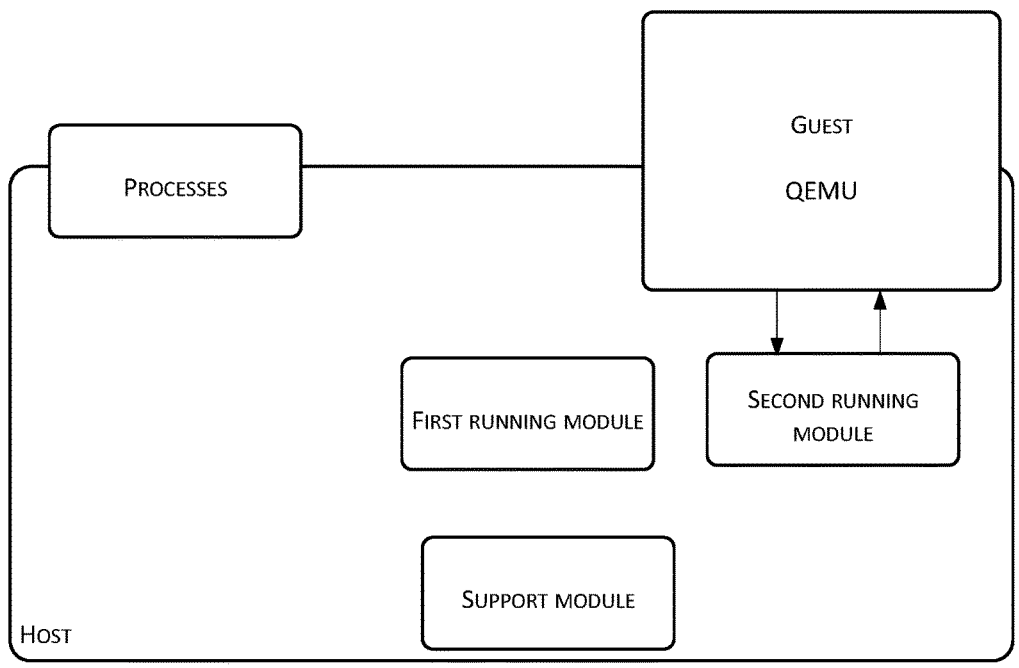
Figure 3D:
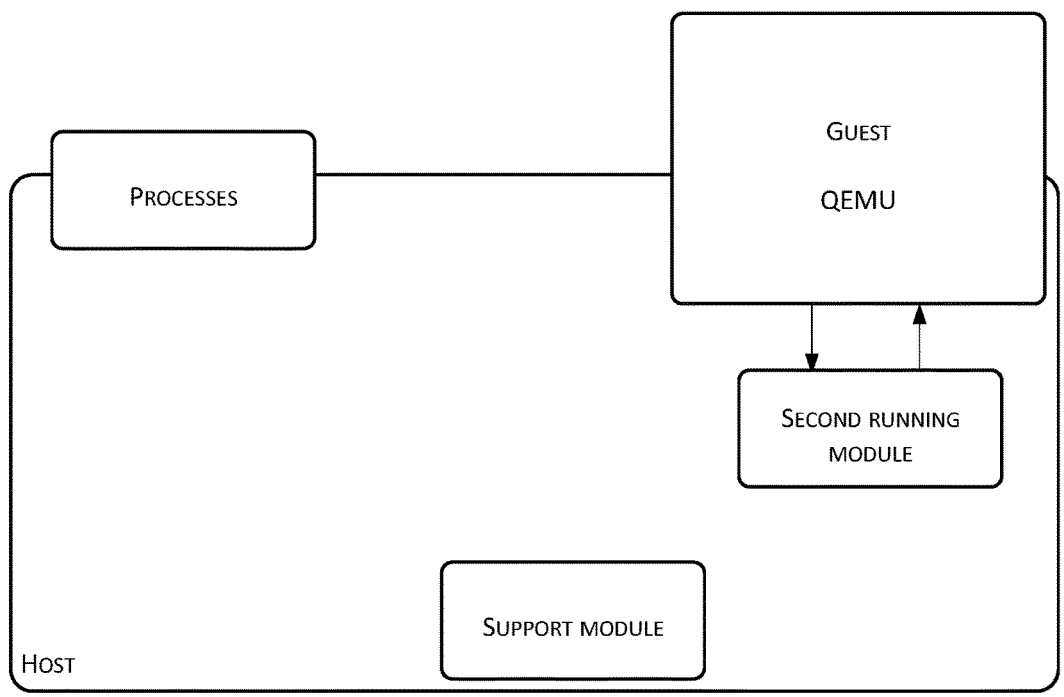

FIGS. 3(A)-3(D) show flowcharts of processes 302-308 of an online upgrade of a kernel-based virtual machine module. Continuing with the previous example, dual-active running modules include kvm-platform-0.ko and kvm-platform-1.ko. As shown in FIG. 3(A), prior to a certain upgrade, a first running module is kvm-platform-0.ko, and the first running module used by a machine virtualizer is kvm-platform-0.ko. When the first running module (i.e., kvm-platform-0.ko) has a bug or needs to have a functional update, an upgrade stage is entered. During a process of upgrade, the second running module, kvm-platform-1.ko, is first obtained by compiling an upgrade version of codes of the first running module, kvm-platform-0.ko, as shown in FIG. 3(B). The machine virtualizer is then switched to use the second running module, kvm-platform-1.ko, as shown in FIG. 3(C).

The first running module and the second running module are not fixed running modules. For example, in a next upgrade following the above example, kvm-platform-1.ko acts as the first running module, i.e., the machine virtualizer uses kvm-platform-1.ko as the first running module. The second running module, which is kvm-platform-0.ko, is obtained by compiling the codes of the first running module (kvm-platform-1.lo). The machine virtualizer switches to use kvm-platform-0.ko as the second running module. Upgrades are performed according to such cycle in subsequent upgrade processes.

Furthermore, the second apparatus 104 includes a third unit (not shown in the figure). The third unit causes the support module to support the first running module and the second running module. During the upgrade, a vmm-exclusive function (a virtual machine exclusive function) the support module is not turned off throughout the time to avoid about 5% reduction in performance due to turning off this function. The support module supports running modules in a dual-active mode. In other words, the support module can support two running modules at the same time. For example, it is possible to run a virtual machine that uses the first running module and a virtual machine that uses the second running module at the same time. The first running module is allowed to support virtual machine(s) before the upgrade, and is switched to the running module after upgrade. This does not affect normal running of the virtual machine(s), and can ensure hot upgrade without sacrificing the performance.

Furthermore, the second apparatus 104 also include a fourth unit (not shown in the figure). The fourth unit inserts the second running module into a kernel, i.e., inserts into a host, after the second running module is obtained by compiling according to the upgrade version of the codes of the first running module.

Continuing the previous example, below is an effect of using lsmod|grep kvm command when inserting the support module (kvm.ko), the first running module (kvm-platform-0.ko), and kvm-platform-1.ko into a host as shown in FIG. 3(C), for example.

| kvm_platform_1 | 0 | |
|---|---|---|
| kvm_platform_0 | 40 | |
| kvm | 2 | kvm_platform_1, kvm_platform_0 |

"kvm_platform_0 40" represents that it is the first running module current supporting the support module. "kvm 2 kvm_platform_1, kvm_platform_0" represents that the support module supports two running modules, kvm_platform_1 and kvm_platform_0.

In implementations, the first running module and the second running module use different export facilities. An export facility is used for exporting a user mode interface.

Continuing with the previous example, dual-active running modules kvm_platform_0 and kvm_platform_1 individually use different export facilities, e.g., separately using /dev/kvm0 and /dev/kvm1, for example.

The second apparatus 104 further include a fifth unit (not shown in the figure). The fifth unit is used for adding parameter(s) in the machine virtualizer. The parameter(s) is/are used for switching the machine virtualizer from using an export facility of the first running module to using an export facility (misc facility) of the second running module.

For example, following with the previous example, dual-active running modules, kvm-platform-0.ko and kvm-platform-1.ko, separately use different export facilities, for example, separately using /dev/kvm0 and /dev/kvm1. Prior to a certain upgrade, the first running module is kvm-platform-0.ko, and the machine virtualizer designates to use the first running module (which is kvm-platform-0.ko) through the export facility /dev/kvm0. After compiling to obtain the second running module (kvm-platform-1.ko), the machine virtualizer, through added parameters, causes the machine virtualizer to use the second running module (kvm-platform-1.ko) through the export facility /dev/kvml, to achieve the online upgrade (i.e., the hot upgrade). In implementations, this switching process achieves an online upgrade (i.e., a hot upgrade) of the machine virtualizer in one time. In the process of hot upgrade of the machine virtualizer, the machine virtualizer (the old machine virtualizer can also be used if a current goal is to upgrade the kvm running module only) is instructed to use the second running module (i.e., the upgrade version of the running module) through the parameters. Apparently, one skilled in the art can understand that a process of switching a machine virtualizer to use a running module is not limited to a completion of a process of hot upgrade of the machine virtualizer. Other methods that can achieve switching of the machine virtualizer are also covered in the scope of the concepts of the present disclosure.

Figure 4:
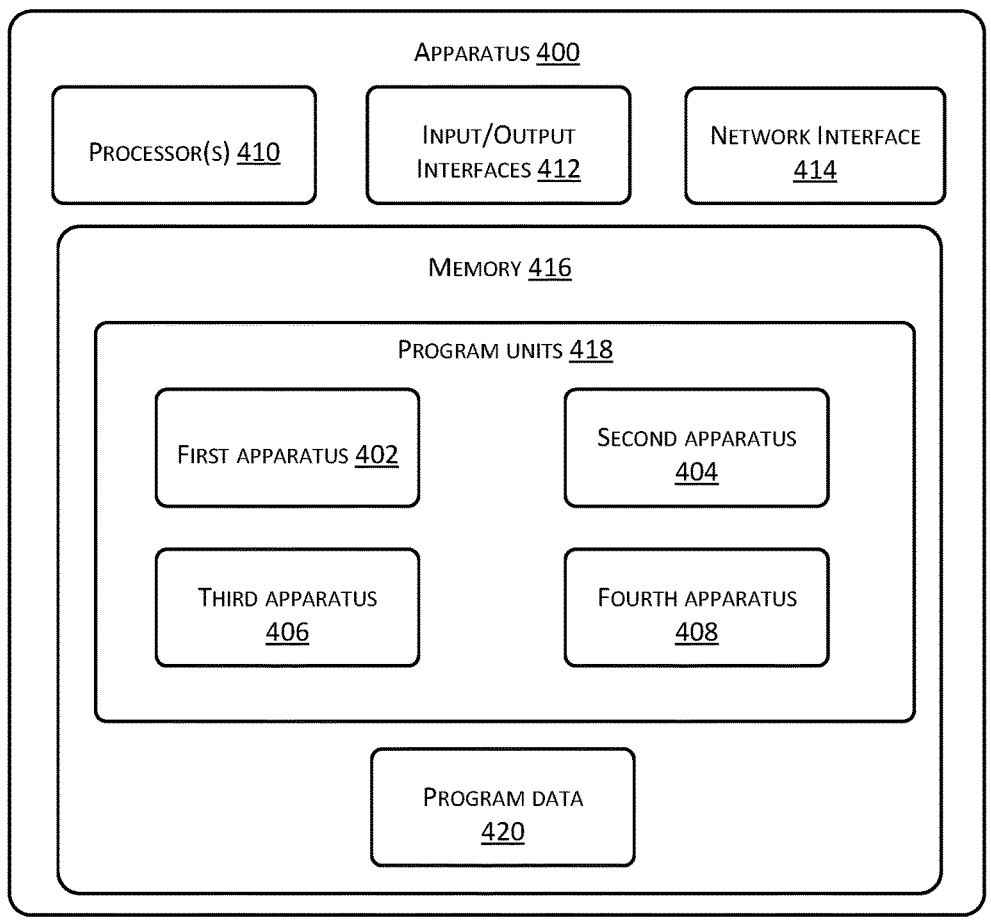
FIG. 4 shows a schematic diagram of an apparatus/device for online upgrading a kernel-based virtual machine module in accordance with the present disclosure.

FIG. 4 shows a schematic diagram of an apparatus or device 400 for online upgrading a kernel-based virtual machine module in accordance with the present disclosure. The apparatus or device 400 includes a first apparatus 402, a second apparatus 404, and a third apparatus 406.

The first apparatus 402 and the second apparatus 404 are contextually or basically the same as the first apparatus 102 and the second apparatus 104 that are shown in FIG. 1, and will not be repeatedly described herein for the brevity of description.

The third apparatus 406 removes the first running module after the machine virtualizer switches to use the second running module.

Continuing with the previous example and reference to FIG. 3, in a certain upgrade, the first running module is kvm-platform-0.ko. The second running module (kvm-platform-1.ko) is obtained by compiling the upgrade version of the codes of the first running module (kvm-platform-0.ko). After the machine virtualizer is switched to use the second running module (which is kvm-platform-1.ko), the third apparatus 406 removes the first running module (which is kvm-platform-0.ko) as shown in FIG. 3(D). If updates are performed at subsequent stages, a second running module (kvm-platform-0.ko) is obtained by compiling based on an upgrade version of codes of the current running module (kvm-platform-1.ko). The second running module (kvm-platform-0.ko) can be distinguished from the previously removed kvm-platform-0.ko using different version numbers, and a cycle is in order subsequently. Since the support module supports the dual-active mode, removing the first running module after the upgrade is completed can effectively prevent the machine virtualizer from mistakenly using an old version (one that is not currently updated) of the running module.

In implementations, in each upgrade process, a cycle is performed in which the platform machine virtualizer first uses the first running module and the first running module compiles to obtain a second running module based on an upgrade version of codes of the first running module when the second apparatus 404 performs the upgrade. The second running module is an upgrade version of the first running module. The machine virtualizer is then switched to use the second running module, and the third apparatus 406 removes the first running module after the machine virtualizer is switched to use the second running module, thus implementing an online upgrade.

Furthermore, the apparatus or device 400 also includes a fourth apparatus 408. The fourth apparatus 408 performs an upgrade for the machine virtualizer.

An upgrade process of the machine virtualizer can be performed synchronously or asynchronously with the upgrade process of the KVM module.

In implementations, the apparatus or device 400 may further include one or more processors 410, an I/O interface 412, a network interface 414, and memory 416. The memory 416 may include program units 418 and program data 420. The memory is an example of a processor-readable media or computer-readable media as described in the foregoing description.

Figure 5:
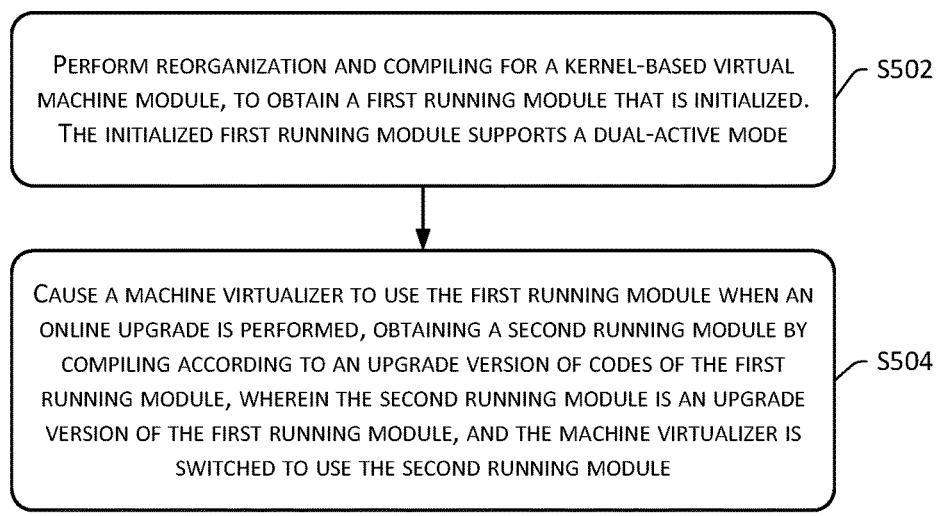
FIG. 5 shows a flowchart of a method for online upgrading a kernel-based virtual machine module in accordance with the present disclosure.

FIG. 5 shows a flowchart of a method 500 for online upgrading a kernel-based virtual machine module in accordance with an aspect of the present disclosure. In implementations, the method 500 includes S502 and S504.

At S502, the apparatus or device 100 performs reorganization and compiling for a kernel-based virtual machine module, to obtain a first running module that is initialized. The initialized first running module supports a dual-active mode. At S504, the apparatus or device 100 causes the machine virtualizer to use the first running module first when an online upgrade is performed. The first running module compiles to obtain a second running module based on an upgrade version of codes of the first running module. The second running module is an upgrade version of the first running module. The machine virtualizer is then switched to use the second running module.

The apparatus or device 100 includes, but is not limited to, a network device, a touch terminal, or a device formed by integrating a network device and a touch terminal via a network. Implementations of the network device includes, but is not limited to, a network host, an individual network server, a set of multiple network servers, a set of computers based on cloud computing, etc. The cloud computing is a type of distributed computing, and is a super virtual computer that is formed by loosely coupling a set of computers with one another. In implementations, the apparatus or device 100 may also be gaming software that runs in a touch terminal, such that a user can enjoy entertainment using the touch terminal as a medium. The touch terminal is an electronic product that allows human-machine interactions via a touch screen, e.g., a smartphone, a PDA, a portable gaming device, a handheld computer PPC, a portable device, or a tablet computer, etc. The touch screen includes a capacitive touch screen. One skilled in the art can understand that the apparatus or device 100 and the touch terminal are merely examples. Other existing or future apparatuses or touch terminals, if being suitable for and applicable to the present disclosure, are also included in the scope of protection of the present disclosure, and are included herein by reference.

Furthermore, S502 includes S602 and S604. At S602, a minimal portion of functions in the kernel-based virtual machine module that support virtual machine running and support running modules in the dual-active mode are integrated into a support module. The support module is used for supporting all running module. At S604, a large portion of functions in the kernel-based virtual machine module which are not included in the support module are integrated into the first running module.

Figure 6:
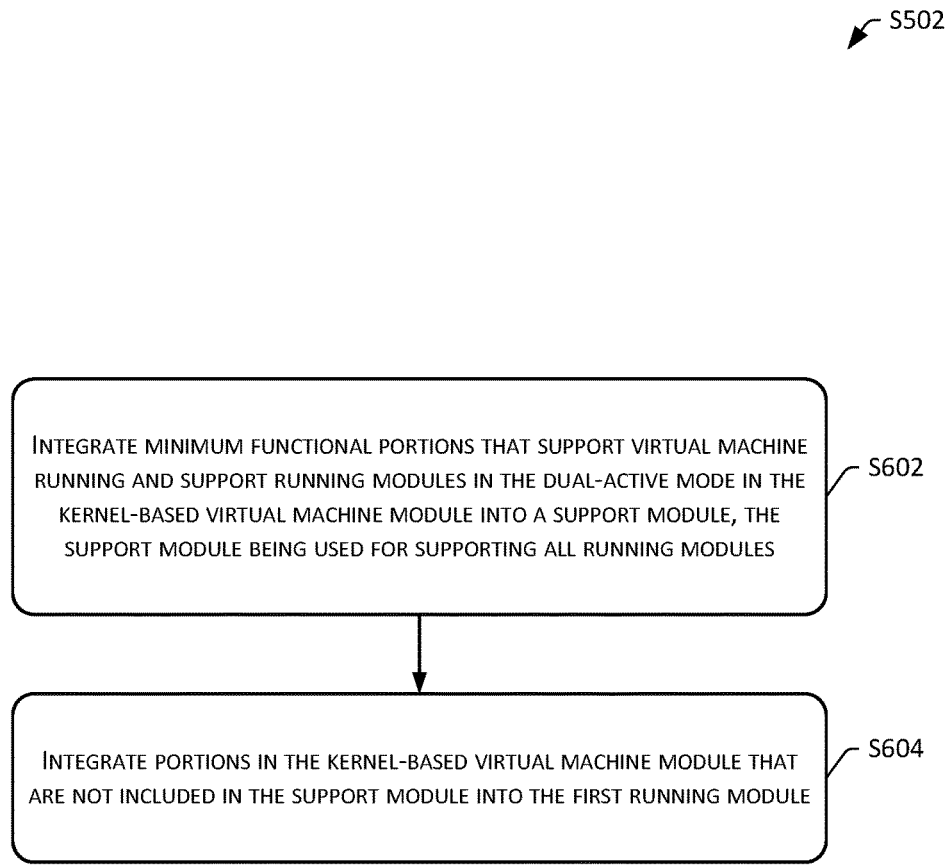
FIG. 6 shows a flowchart of S502 of the method for online upgrading a kernel-based virtual machine module in accordance with the present disclosure.

FIG. 6 shows a flowchart of S502 of the method 500 for online upgrading a kernel-based virtual machine module in accordance with the present disclosure. S502 performs reorganization and compiling for kvm.ko and kvm-platform.ko of an original KVM module through S602 and S604. The first unit 202 integrates a minimal functional portion that supports virtual machine running and supports running modules in a dual-active mode in the kernel-based virtual machine module into a support module. The support module is used for supporting all running modules. The second unit 204 integrates portions in the kernel-based virtual machine module that are not included in the support module into the first running module.

In an exemplary embodiment, an original KVM module (i.e., an original kernel-based virtual machine module) in a KVM virtualization includes two modules—kvm.ko and kvm-platform.ko (where kvm-platform.ko is kvm-amd.ko for an AMD platform) on a platform (i.e., a host such as Linux, AMD platform, etc.). kvm.ko and kvm-platform.ko run in a root mode of a CPU (central processing unit), and are responsible for initializing CPU hardware virtualized function(s), enabling virtual client machine(s) to run in a KVM virtual machine mode, and providing support to the KVM virtual client machine(s) for running. kvm.ko and kvm-platform.ko mainly include some hardware virtualized functions, such as kernel virtualization, CPU virtualization, and may simulate some hardware devices (such as a pit clock) due to performance consideration. kvm.ko includes virtualized function(s) that is/are unrelated to the platform, and kvm-platform.ko includes virtualized function(s) that is/are related to the platform. kvm.ko provides support to kvm-platform.ko.

Specifically, the first apparatus 102 starts to compile an initial first running module and a support module from an original KVM module through a reorganized and compiled code. The initial first running module and the support module are first used to create virtual machine(s). In this case, QEMU (i.e., a quick emulator) uses the initial first running module.

The first unit 202 compiles the original KVM module, and integrates a minimal portion of functions that support virtual machine running and support running modules in the dual-active mode (i.e., functions that are simple and almost unrelated to functional performance, such that codes thereof totally does not need to be modified and updated when a new function is added, and extremely few function codes that are needed to support for running of virtual machine(s) and dual-active functions of the first running module and the second running module when an upgrade is performed) into the support module. The second unit 204 integrates a large portion of functions (which are not included in the support module that is integrated from the two modules—kvm.ko and kvm-platform.ko in the original KVM module) into the initialized first running module. The initialized first running module is used as a first running module during the first upgrade. A second running module is compiled and obtained based on the initialized first running module.

Then, during the online upgrade, S604 includes the following operations:

(1) Causing the machine virtualizer to use the first running module first;

(2) Compiling the upgrade version of the codes of the first running module to obtain the second running module, the second running module being the upgrade version of the first running module; and (3) Causing the machine virtualizer to switch to use the second running module.

In each online upgrade process, operations (1)-(3) in S604 are iteratively performed.

QEMU (i.e., quick emulator) is a component of a KVM virtual machine. The QEMU acts as an upper layer and an interface of the virtual machine, and a client machine (i.e., guest) can operate the virtual machine through the QEMU.

The term "current" refers to a current time point. The first running module is a running module that currently supports virtual machine(s) to run, for example, a running module that is currently used for supporting the virtual machine(s). For example, the first running module, which is currently used for supporting a virtual machine, is kvm-platform-0.ko, and the first running module used by the machine virtualizer uses is kvm-platform-0.ko. In a first upgrade, a running module that supports the virtual machine is switched to kvm-platform-1.ko, and the second running module that the machine virtualizer switches to use is kvm-platform-1.ko. Before the beginning of a second upgrade, the first running module that supports the virtual machine is kvm-platform-1.ko, and the first running module that the machine virtualizer switches to use is kvm-platform-0.ko.

Apparently, one skilled in the art should understand that the names and the number of the running modules are merely examples. Methods that may appear in the future and can implement dual-active running modules are covered in the scope of the concepts of the present disclosure.

Specifically, prior to the online upgrade and prior to obtaining the second running module by compiling in the online upgrade process, the machine virtualizer uses the first running module.

During the online upgrade process, the second running module is compiled using the upgrade version of the codes of the first running module at S504. The second running module is the upgrade version of the first running module. The second running module and the first running module are both in a dual-active state, i.e., the second running module and the first running module can both support running of virtual machine(s), and can both obtain support from the support module.

FIGS. 3(A)-3(D) show flowcharts of processes 302-308 of an online upgrade of a kernel-based virtual machine module. Continuing with the previous example, dual-active running modules include kvm-platform-0.ko and kvm-platform-1.ko. As shown in FIG. 3(A), prior to a certain upgrade, a first running module is kvm-platform-0.ko, and the first running module used by a machine virtualizer is kvm-platform-0.ko. When the first running module (i.e., kvm-platform-0.ko) has a bug or needs to have a functional update, an upgrade stage is entered. During a process of upgrade, the second running module, kvm-platform-1.ko, is first obtained by compiling codes of the first running module, kvm-platform-0.ko, as shown in FIG. 3(B). The machine virtualizer is then switched to use the second running module, kvm-platform-1.ko, as shown in FIG. 3(C).

Apparently, the first running module and the second running module are not fixed running modules. For example, in a next upgrade following the above example, kvm-platform-1.ko acts as the first running module, and the machine virtualizer uses kvm-platform-1.ko as the first running module. The second running module, which is kvm-platform-0.ko, is obtained by compiling the codes of the first running module (kvm-platform-1.lo). The machine virtualizer switches to use kvm-platform-0.ko as the second running module. Upgrades are performed according to such cycle in subsequent upgrade processes.

Furthermore, S504 includes instructing the supporting module to support the first running module and the second running module.

Furthermore, S504 also includes inserting the second running module into a kernel after the second running module is obtained by compiling according to the upgrade version of the codes of the first running module.

In implementations, the first running module and the second running module use different export facilities. An export facility is used for exporting a user mode interface.

Continuing with the previous example, dual-active running modules kvm_platform_0 and kvm_platform_1 individually use different export facilities, e.g., separately using /dev/kvm0 and /dev/kvm1, for example.

S504 further includes adding parameter(s) in the machine virtualizer. The parameter(s) is/are used for switching the machine virtualizer from using an export facility of the first running module to using an export facility (misc facility) of the second running module.

For example, following with the previous example, dual-active running modules, kvm-platform-0.ko and kvm-platform-1.ko, separately use different export facilities, for example, separately using /dev/kvm0 and /dev/kvm1. Prior to a certain upgrade, the first running module is kvm-platform-0.ko, and the machine virtualizer designates to use the first running module (which is kvm-platform-0.ko) through the export facility /dev/kvm0. After the second running module (kvm-platform-1.ko) is obtained by compiling, the machine virtualizer, through a hot upgrade of the machine virtualizer and added parameters, switches to use the second running module (kvm-platform-1.ko) through the export facility /dev/kvml, to achieve the online upgrade (i.e., the hot upgrade).

Figure 7:
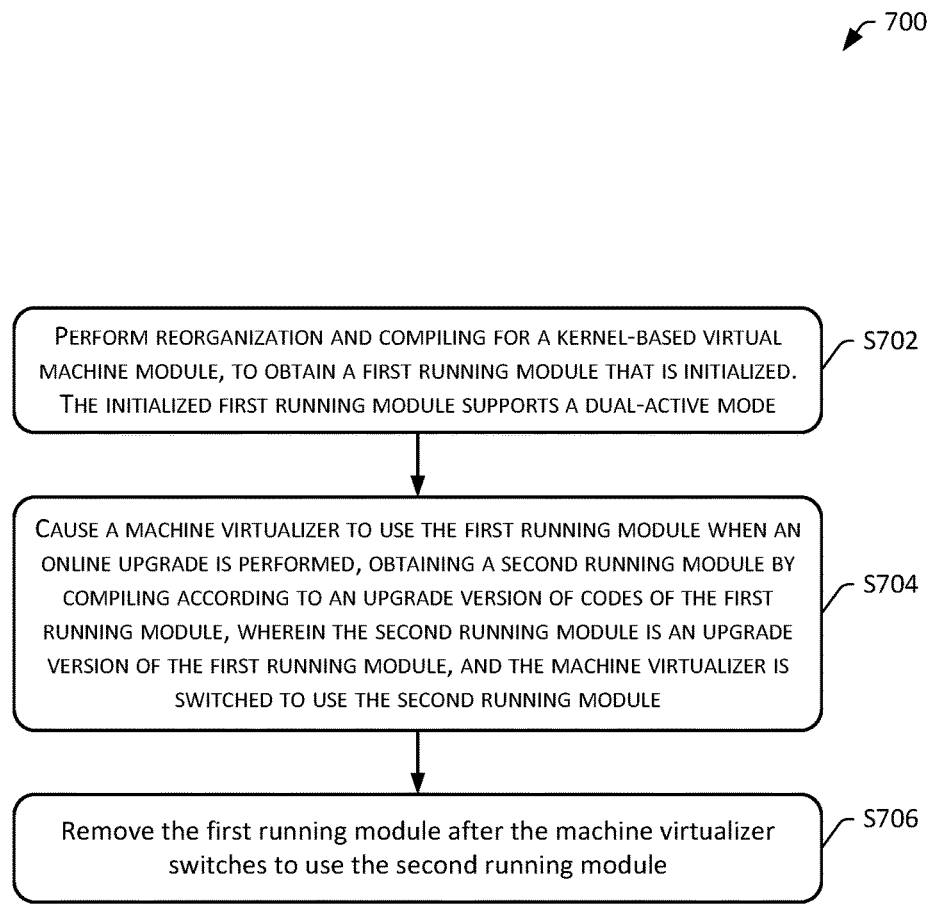
FIG. 7 shows a flowchart of a method for online upgrading a kernel-based virtual machine module in accordance with the present disclosure.

FIG. 7 shows a flowchart of a method 700 for online upgrading a kernel-based virtual machine module in accordance with the present disclosure. In implementations, the method 700 includes S702, S704, and S706.

S702 and S704 are contextually or basically the same as S502 and S504 as shown in FIG. 5, and will not be repeatedly described herein for the brevity of description.

S706 removes the first running module after the machine virtualizer switches to use the second running module.

Continuing with the previous example and reference to FIG. 3, in a certain upgrade, the first running module is kvm-platform-0.ko. The second running module (kvm-platform-1.ko) is obtained by compiling the codes of the first running module (kvm-platform-0.ko). After the machine virtualizer is switched to use the second running module (which is kvm-platform-1.ko), the first running module (which is kvm-platform-0.ko) is removed at S406 as shown in FIG. 3(D). If updates are performed at subsequent stages, a second running module (kvm-platform-0.ko) is obtained by compiling based on an upgrade version of codes of the current running module (kvm-platform-1.ko). The second running module (kvm-platform-0.ko) can be distinguished from the previously removed kvm-platform-0.ko using different version numbers, and a cycle is in order subsequently. Since the support module supports the dual-active mode, removing the first running module after the upgrade is completed can effectively prevent the machine virtualizer from mistakenly using an old version (one that is not currently updated) of the running module.

In implementations, in each upgrade process, when S704 is cyclically performed for online upgrades, the platform machine virtualizer first uses a first running module and a first running module compiles to obtain a second running module based on an upgrade version of codes of the first running module. The second running module is an upgrade version of the first running module. The machine virtualizer is then switched to use the second running module. The first running module is removed at S706 after the machine virtualizer is switched to use the second running module, thus implementing an online upgrade.

Furthermore, the method also includes upgrading the machine virtualizer.

An upgrade process of a machine virtualizer (QEMU) can be performed synchronously or asynchronously with an upgrade process of a KVM module. Following with the previous example, QEMU is instructed to switch from using a running module (kvm-platform-0.ko) to using a running module (kvm-platform-1.ko). A time duration of the upgrade is within a range of 100 ms-200 ms (mechanical hard disk environment, with a possibly shorter time for SSD hard disk environment), which can completely make the upgrade process unnoticeable to a user.

As compared with the existing technologies, the method and the apparatus of the present disclosure obtain a first running module that is initialized by reorganizing and compiling a kernel-based virtual machine module, the initialized first running module supporting a dual-active mode. When an online upgrade is performed, a machine virtualizer is caused to use the first running module first, and the first running module compiles an upgrade version of codes of the first running module to obtain a second running module. The second running module is an upgrade version of the first running module. The machine virtualizer is then switched to use the second running module. As such, upgrading the kernel-based virtual machine module can be achieved without shutting down a virtual machine, thus making fast upgrades and iterations (e.g., an introduction of new features, a bug fix, etc.) of the kernel-based virtual machine module to become possible. Furthermore, upgrades are not noticeable to the users during a process thereof, and thus the core competitive power of the virtualization technology is improved.

It should be noted that the present disclosure can be implemented using software and/or a combination of software and hardware, for example, can be implemented using an application-specific integrated circuit (ASIC) via a target computer or any other similar hardware devices. In an embodiment, a software program of the present disclosure can implement the foregoing steps or functions through an execution of processor(s). Similar, the software program (including related data structure(s)) of the present disclosure can be stored in a computer-readable recording media, such as a RAM storage device, a magnetic or optical drive or floppy disk, or similar devices. Moreover, some operations or functions of the present disclosure can be implemented using hardware, such as circuits that cooperate with processor(s) to implement various operations or functions.

Furthermore, a portion of the present disclosure can be applied as a computer program product. Examples include computer program instructions that, when executed by a computer, can invoke or provide the method and/or the technical solution of the present disclosure through operations of the computer. The program instructions that invoke the method of the present disclosure can be stored in a fixed or movable recording media, and/or can be transmitted through a data flow in a transmission or other signal carrier media, and/or can be stored in working memory of a computing device that runs according to the program instructions. According to an embodiment of the present disclosure which includes an apparatus, the apparatus includes a storage device that is used for storing computer program instructions and processor(s) that is/are used for executing the program instructions. When the computer program instructions are executed by the processor(s), the apparatus is instructed to run the method and/or the technical solution according to the foregoing embodiments of the present disclosure.

It is apparent to one skilled in art that the present disclosure is not limited to the details of the exemplary embodiments as described above. The present disclosure can be implemented in other forms without departing the spirit and the basic features of the present disclosure. Therefore, regardless of which point of view, the embodiments are considered as exemplary, and not limiting. The scope of the present disclosure is defined by the appended claims and not the above description. Therefore, all variations having meanings and scopes that are equivalent to the appended claims shall be covered by the present disclosure. Drawing labels in the appended claims should not be construed as limitations to the corresponding appended claims. Furthermore, a term "including" apparently does not exclude other units or acts, and a singular form does not exclude a plural form. Multiple units or apparatuses described in the appended apparatus claims can be implemented by a single unit or apparatus using a software or hardware component. Terms such as first, second, etc., are used for representing names, and do not imply any particular order.

The invention claimed is:

1. A method comprising:
reorganizing and compiling a kernel-based virtual machine module to obtain a first running module, the first running module supporting a dual-active mode;
causing a machine virtualizer to use the first running module when an online upgrade is performed;
compiling an upgrade version of codes of the first running module to obtain a second running module, the second running module being an upgrade version of the first running module;
adding parameters in the machine virtualizer, the parameters being used for switching the machine virtualizer from using an export facility of the first running module to an export facility of the second running module; and
switching the machine virtualizer to use the second running module after the online upgrade is completed.

2. The method of claim 1, wherein reorganizing and compiling the kernel-based virtual machine module comprises:
integrating a minimal functional portion that supports running of one or more virtual machines and support running modules in the dual-active mode in the kernel-based virtual machine module into a support module, the support module being used for supporting all the running modules; and
integrating portions in the kernel-based virtual machine module that are not included in the support module into the first running module.

3. The method of claim 2, further comprising causing the support module to support the first running module and the second running module.

4. The method of claim 1, further comprising inserting the second running module into a kernel after obtaining the second running module.

5. The method of claim 1, wherein the first running module and the second running module use different export facilities, the export facilities being used for exporting respective user state interfaces.

6. The method of claim 1, further comprising removing the first running module after switching the machine virtualizer to use the second running module.

7. The method of claim 1, further comprising upgrading the machine virtualizer.

8. An apparatus comprising:
one or more processors;
memory storing executable instructions that, when executed by the one or more processors, cause the one or more processors to perform acts comprising:
reorganizing and compiling a kernel-based virtual machine module to obtain a first running module, the first running module supporting a dual-active mode; and
causing a machine virtualizer to:
use the first running module,
obtain a second running module by compiling according to an upgrade version of codes of the first running module,
add parameters for switching from using an export facility of the first running module to an export facility of the second running module, and
switch to use the second running module,
wherein the second running module is an upgrade version of the first running module.

9. The apparatus of claim 8, the acts further comprising:
integrating a minimal functional portion that supports virtual machine running and support running modules in the dual-active mode in the kernel-based virtual machine module into a support module, the support module being used for supporting the running modules; and
integrating portions in the kernel-based virtual machine module that are not included in the support module into the first running module.

10. The apparatus of claim 8, further comprising inserting the second running module into a kernel after the second running module is obtained.

11. The apparatus of claim 8, wherein the first running module and the second running module use different export facilities, the export facilities being used for exporting respective user state interfaces.

12. One or more processor-readable media storing executable instructions that, when executed by one or more processors, cause the one or more processors to perform acts comprising:
reorganizing and compiling a kernel-based virtual machine module to obtain a first running module, the first running module supporting a dual-active mode;
causing a machine virtualizer to use the first running module when an online upgrade is performed;
compiling an upgrade version of codes of the first running module to obtain a second running module, the second running module being an upgrade version of the first running module;
adding parameters in the machine virtualizer, the parameters being used for switching the machine virtualizer from using an export facility of the first running module to an export facility of the second running module; and switching the machine virtualizer to use the second running module after the online upgrade is completed.

13. The one or more processor-readable media of claim 12, wherein reorganizing and compiling the kernel-based virtual machine module comprises:
   integrating a minimal functional portion that supports running of one or more virtual machines and support running modules in the dual-active mode in the kernel-based virtual machine module into a support module, the support module being used for supporting all the running modules; and
   integrating portions in the kernel-based virtual machine module that are not included in the support module into the first running module.

14. The one or more processor-readable media of claim 13, the acts further comprising causing the support module to support the first running module and the second running module.

15. The one or more processor-readable media of claim 12, the acts further comprising inserting the second running module into a kernel after obtaining the second running module.

16. The one or more processor-readable media of claim 15, wherein the first running module and the second running module use different export facilities, the export facilities being used for exporting respective user state interfaces.

17. The one or more processor-readable media of claim 12, the acts further comprising removing the first running module after switching the machine virtualizer to use the second running module.

18. The one or more processor-readable media of claim 12, the acts further comprising upgrading the machine virtualizer.

* * * * *